US006425974B1

(12) United States Patent
Bryant et al.

(10) Patent No.: US 6,425,974 B1
(45) Date of Patent: Jul. 30, 2002

(54) PROCESS FOR TREATING WASTEWATER FROM A BLEACH PLANT

(75) Inventors: Patrick Bryant, Roswell, GA (US); Jiri Basta, Partille (SE)

(73) Assignee: Akzo Nobel N.V., Arnhem (NL)

( * ) Notice: Subject to any disclaimer, the term of this patent is extended or adjusted under 35 U.S.C. 154(b) by 0 days.

(21) Appl. No.: 09/380,335
(22) PCT Filed: Feb. 20, 1998
(86) PCT No.: PCT/SE98/00309
§ 371 (c)(1), (2), (4) Date: Nov. 8, 1999
(87) PCT Pub. No.: WO98/39258
PCT Pub. Date: Sep. 11, 1998

(30) Foreign Application Priority Data

Mar. 7, 1997 (EP) ............................................. 97850036

(51) Int. Cl.[7] .............................. D21C 11/00; D21C 9/10
(52) U.S. Cl. ..................... 162/29; 162/30.1; 162/DIG. 8
(58) Field of Search ....................... 162/29, 30.1, 30.11, 162/33, 60, 89, 190, DIG. 8

(56) References Cited

U.S. PATENT DOCUMENTS

| 3,986,951 A | 10/1976 | Fremont ...................... 204/95 |
| 5,061,343 A | 10/1991 | Azarniouch et al. .......... 162/16 |

FOREIGN PATENT DOCUMENTS

| EP | 0 540 091 | 5/1993 | ............ D21C/9/10 |
| EP | 0 716 182 | 6/1996 | ............ D21C/9/10 |
| WO | WO 96/11299 | 4/1996 | ............ D21C/11/00 |

OTHER PUBLICATIONS

Brian Blackwell, Recycle of Bleach Plant Extraction Stage Effluent To The Kraft Liquor Cycle: A Theoretical Analysis, *International Chemical Recovery Conference*, (1992), pp. 329–350 (abstract attached).

Jiri Basta, Partial Closure In Modern Bleaching Sequence, *International Pulp Bleaching Conference*, (1996) pp. 341–346 (abstract attached).

M.D. Afonso and M.N. De Pinho, Treatment Of Bleaching Effluents by Pressure–Driven Membrane Processes—A Review, *Membrane Technology: Applications To Industrial Wastewater Treatment* , (1995) pp. 63–79 (abract attached).

*International Search Report*, dated Aug. 6, 1998.

B. Blackwell, Ultrafiltration Of Kraft Bleach Plant Effluent: Process Design And Cost Estimate, *Environmental Conference* (1992) pp. 603–614.

*Primary Examiner*—Dean T. Nguyen
(74) *Attorney, Agent, or Firm*—Lainie E. Parker; Ralph J. Mancini

(57) ABSTRACT

The process according to the present invention relates to the treatment of wastewater discharged from a bleach plant and more particularly treatment of bleach plant alkaline wash filtrate from treatment-steps and/or delignification/bleaching-steps of pulp. Further improvements of known processes are needed for solving the problems associated with the recovery of alkaline filtrates into the chemical recovery system. According to the process of the present invention, alkaline wash filtrate from treatment-steps and/or delignification/bleaching-steps of pulp is treated in a process by the following steps: i) treating at least a part of the alkaline filtrate in order to produce an alkaline concentrate enriched in high molecular weight dissolved organic compounds and a stream depleted in organic compounds, where the share of the alkaline concentrate to the total amount of the alkaline filtrate corresponds to a volume reduction factor (VRP) in the range of from about 2.0 up to about 7.5; ii) withdrawing the depleted stream; iii) collecting at least a part of the alkaline concentrate from step i) and using the concentrate as wash or dilution water in brownstock washing fiberline with a dilution factor of up to about 4.0, where at least a part of the washing filtrate is brought to the chemical recovery system.

11 Claims, No Drawings

PROCESS FOR TREATING WASTEWATER FROM A BLEACH PLANT

This application is the national stage of PCT/SE98/00309, filed Feb. 20, 1998, and claims priority of EP 97850036.1, filed Mar. 7, 1997.

FIELD OF THE INVENTION

The process according to the present invention relates to the treatment of waste water discharged from a bleach plant and more particularly treatment of bleach plant alkaline wash filtrate from treatment-steps and/or delignification/bleaching-steps of pulp.

When trying to close up the water circuits of lignocellulose bleach plants, in order to reduce the environmental impact of that bleaching, there is a growing need for a process with which it is possible to recycle a portion of the bleach plant's washer filtrates to the brownstock washing fiberline and thereby reduce the ultimate discharge of pollutants to the environment. Especially important is the development of a process which will reduce the discharge of AOX (absorbable organic halogen), BOD (biological oxygen demand), COD (chemical oxygen demand), colors and other potentially regulated parameters.

Generation of large amounts of bleach plant waste water is of course disadvantageous and contradictory to the aim of closing up the bleach plant. If too much bleach plant washer filtrates are recycled in the pulp mill, the impact on the chemical recovery system will be too high. Hence, process equipment such as the black liquor evaporators are not constructed for recycle of large amounts of waste water. Additionally, process equipment in the recovery system is very sensitive to the introduction of chlorides and other inorganic substances from the recovery of bleaching wash filtrates. Increased concentrations of inorganic cations and anions resulting from bleach plant closure may cause many negative effects including the formation of scale deposits (incrustations), corrosion and consumption of bleaching chemicals.

Basta et al. "Partial Closure in Modem Bleaching Sequences," Proceedings of TAPPI International Pulp Bleaching Conf. (1996), Tappi, pp 341–346, teaches the importance of keeping elementary chlorine free (ECF) alkaline effluents separate from acid effluents. The acid effluent is more responsive to biological waste treatment and contains a higher level of elements that are undesirable to return to the pulping liquor cycle.

Full counter-current washing is a well known operation for decreasing the amount of fresh wash water used in washing and dewatering the pulp. However, it is not desirable to mix alkaline and acidic streams in the bleach plant, which occurs when strictly counter-current washing is applied. In bleaching operations, for example in the case of elemental chlorine free (ECF) bleaching, it is desirable not to concentrate the inorganic substances along with the organic substances. Acid waste water and alkaline waste water from a bleach plant comprise different amounts of inorganic and organic material and have varying salt contents. Thus, the alkaline waste water comprises a great deal of relatively high molecular weight organic material and sodium alkali, whereas the acid waste water primarily comprises lower molecular weight organics and inorganic salts, such as calcium, magnesium, chloride, chlorate etc. If the acid and the alkaline waste water are mixed, it becomes more difficult to separate the different substances from the process flow in a subsequent treatment, which is disadvantageous in methods aiming at closing up the bleach plant. As little as possible of the chlorides should be concentrated with the organics. Mixing of alkaline and acidic streams may result in problems due to the formation of reaction products, so-called incrustations, which are difficult to separate. The incrustations also clog up washing equipment, heat exchange equipment and evaporators, thus necessitating frequent stoppages for chemical and mechanical cleaning of the unit operations. Foam formation may also occur when treating mixed waste water which can result in operating difficulties or increased costs for defoaming agents.

Blackwell et al, "Recycle of Bleach Plant Extraction Stage Effluent to the Kraft Liquor Cycle: A Theoretical Analysis", Int. Chemical Recovery Conf. (1992), Tappi, pp 329–350, discloses a process for recycling bleach plant extraction stage filtrate without pre-treatment for reduction of AOX, BOD, color, toxicity etc. The conclusion was that up to 50% of the extraction stage filtrate effluent could be directly recycled into the brownstock fiberline at a point with weight % dissolved solids similar to those contained in the alkaline filtrate, but with a 16% increase in chemical recovery evaporation load.

Afonso et al, "Treatment of Bleaching Effluents by Pressure-driven Membrane Processes—A Review", in "Membrane Technology: Applications to Industrial Waste Water Treatment, Kluwer Academic Publishers (1995), pp. 63–79, summarize prior art documents which use membrane filtration of bleach plant filtrates to concentrate organics into a volumes of less than $\frac{1}{8}$ of the initial volume with the intent to bypass the brownstock fiberline and take the concentrate directly back to the chemical recovery system for evaporation prior to combustion.

Blackwell et al, "Ultrafiltration of Kraft Bleach Plant Effluent: Process Design and Cost Estimate", Int. Environmental Conf. (1992), Tappi, pp 603–614, discloses a process for recycling bleach plant extraction stage filtrate with pretreatment by ultrafiltration for reduction of AOX, BOD, color, toxicity etc. The conclusion was that most of the extraction stage filtrate effluent could be treated by ultrafiltration to reduce its volume to approximately $\frac{1}{15}$ of its initial volume, then recycle it directly into the weak black liquor to achieve an overall bleach plant reduction of 40% color and 25% AOX with a 7% increase in chemical recovery evaporation load. Additionally, this prior art teaches that any recycle of alkaline filtrate concentrate into the brownstock fiberline must be done at a point were the weight % dissolved solids equal or exceed those in the alkaline concentrate.

Known processes have shown the need for, and the problems associated with, the recovery of alkaline filtrates into the chemical recovery system. Improvements for solving the problems have been shown, but further improvement is needed to: 1) increase total recovery efficiency of COD, AOX and other dissolved high molecular weight organics; 2) reduce additional evaporation load in chemical recovery; 3) reduce restrictions on where the alkaline concentrate can be introduced into the fiberline.

From the known processes, it is obvious that strictly counter-current washing of bleach plant wash filtrates to the brownstock washing fiberline should be avoided, if aiming at reduction of hazardous compounds for the environment. A direct recycle of primarily alkaline wash filtrate from the bleach plant is preferred. For example, in the use of a so called jump-stage washing configuration, a bleach plant's alkaline stage filtrate may be taken around its preceding bleach stage which has material undesirable to recycle, for example an acid stage filtrate, to any preceding brownstock washer while sewering the jumped bleach stage filtrate. In a direct recycling of bleach plant alkaline filtrate for use as wash or dilution water on the pulp system, e.g. with the use of the above mentioned jumpstage washing, it is also important to use relatively precise amounts of wash water. In such a washing operation, the amount of dissolved solids in the washing that can be pushed back to the chemical recovery cycle is limited by washer efficiencies and by the hydraulic balance. The key problem with using jump stage washing of bleach plant alkaline filtrate as shower water for the last brownstock pulp washer is that most of the alkaline filtrate applied in excess of the brownstock fiberline washer dilution factor (OF), will carry forward most of that excess alkaline filtrate to the jumped bleach stage , and exit with the jumped stage's filtrate. In general, this hydraulic constraint will limit jump stage partial bleach plant closure to 20–50% of the total bleach plant alkaline filtrate flow. In the case where the dissolved organics not are concentrated into a volume small enough, in the recirculation of alkaline filtrates for introduction upstream of an open bleach stage, the carryover of dissolved organics into the open bleach stage would be great (open bleach stage means sewering of the bleach filtrate, e.g. for external treatment or mill receiving water body). In addition, a large volume of bleach plant alkaline wash filtrate used in place of any brownstock wash or dilution water other than fresh water, which is usually only applied to any significant degree to the last brownstock washer, would imply a significant increase on the evaporation load in chemical recovery. These problems or drawbacks can be eliminated to a large extent when using the technique according to the invention.

Thus, when using bleach plant alkaline filtrate as wash water for the brownstock fiberline it is important that the recycled alkaline filtrate comprises a reduced amount of low molecular weight inorganics other than sodium and sulphur, while the largest possible amount of organic substances are enriched in the concentrated alkaline filtrate for recycle. Treatment of the alkaline filtrates before recirculation should ideally reduce the low molecular weight inorganics such as $Cl^{31}$, $CO_3^{-2}$, $C_2O_4^{-2}$, $SO_4^{-2}$, $Ba^{+2}$, $Mg^{+2}$, and $Ca^{+2}$ in approximately the same proportion to the water volume reduction, making this stream more desirable for return to the brownstock washing area. Therefore, the inorganics should preferably follow equally with the water split, if not enriched in the non-organic stream.

The organics in the class of resin acids and sterols are considered potentially toxic, and a high retention of these in the concentrate is achievable. To maximize their retention, the volume reduction is kept within an optimal range, lower than recommended by known processes. If the volume reduction in the concentrate of the alkaline filtrates is too high, less of these organics will remain in the concentrate stream.

SUMMARY OF THE INVENTION

According to the present invention a process is provided for reducing the amount of dissolved organic compounds in waste water discharged from a bleach plant, as described in the claims. In the process, alkaline wash filtrate from treatment-steps and/or delignification/bleaching-steps of pulp is treated in a process by the following steps: i) treating at least a part of the alkaline filtrate in order to produce an alkaline concentrate enriched in high molecular weight dissolved organic compounds and a stream depleted in organic compounds, where the share of the alkaline concentrate to the total amount of the alkaline filtrate corresponds to the volume reduction factor (VRF), which is in the range of from about 2.0 up to about 7.5; ii) withdrawing the depleted stream; iii) collecting at least a part of the alkaline concentrate from step i) and using the concentrate as wash or dilution water in brownstock washing fiberline with a dilution factor of up to about 4.0, where at least a part of said washing filtrate is further brought in one or more steps to the chemical recovery system.

DETAILED DESCRIPTION OF THE INVENTION

An advantage with the process of the present invention is that the drawbacks of the known processes can be essentially eliminated so that higher levels of the dissolved organics can be successfully washed back through the brownstock fiberline into the weak black liquor, and it is not required that they be input into the fiberline at a point preceding where the weight % dissolved solids concentration equal or exceed those in the alkaline concentrate. This enables the concentrate to be added only as replacement wash or dilution water for fresh water within the brownstock fiberline, thereby creating significantly lower increases in chemical recovery evaporation load compared to known processes. According to the invention, the volume reduction factor used in the concentration of alkaline filtrates, gives a much higher level of the COD, AOX, color and other organic compounds in the concentrate which can be recovered and ultimately destroyed by combustion in kraft liquor recovery boiler after its use in brownstock washing, over what has been indicated by known processes. This technique also allows for the inorganics in the alkaline filtrate not to be concentrated along with the organics. Thus, further enhancing the benefits of keeping selected filtrates from the bleach plant separate, by avoiding the recovery of components which can cause the formation of scale deposits, corrosion, foam and increased consumption of bleaching chemicals.

Furthermore, by recovering a significant portion of the bleach plant's alkaline concentrate filtrates, over 50% of the bleach plant's discharge of COD and color can be eliminated in many cases. The AOX discharged from the bleach plant to the effluent treatment system or receiving waters can be reduced by as much as 30%. Additionally, the new process according to the invention allows for the separation of low and high molecular weight COD and AOX compounds. It has been shown that these lower molecular weight COD and AOX organic compounds are easier to biodegrade in biological waste treatment systems. Therefore, the high molecular weight COD and AOX is most important to recover and remove from the bleach plant's waste effluents.

Yet another advantage is that bleach plant alkaline filtrates can be recycled without implying a significant impact of the evaporation load in chemical recovery.

Hence, the present process is a concept for partial closure of a bleach plant, which significantly lowers the COD discharge and the constituent organics represented by that COD for both ECF and TCF bleaching processes for pulp. The process is of greatest interest when trying to recover all or a portion of alkaline bleach stage filtrates in either ECF or TCF bleaching of pulp while discharging a portion or all of the acid (or slightly alkaline) bleach stage filtrates.

According to the invention, alkaline bleach wash filtrate is collected from washing or dewatering of the pulp in the bleach plant. Acid bleach wash filtrate as well as slightly alkaline wash filtrates, which comprise a high amount of inorganic compounds, are discharged. In such operations, at least a part of the alkaline wash filtrate from treatment-steps and/or delignification/bleaching-steps of pulp is treated in the process according to the invention. Preferably a major part of the alkaline wash filtrate from a bleach plant is treated. At least about 50% of the total bleach plant alkline filtrate flow can be treated, suitably at least about 60% and preferably at least 70%. In the process, at least a part of the alkaline filtrate is treated in order to produce an alkaline concentrate enriched in high molecular weight dissolved organic compounds and a stream depleted in organic compounds. The alkaline concentrate comprise preferably from about 55% up to about 99% of overall COD, about 60% up to about 99% of overall Color, about 55% up to about 99% of overall AOX, from about 15% up to about 99% of overall resin acids and sterols and from about 15% up to about 60% of overall of chlorides, based on the total bleach plant alkline filtrate flow. At least a part of the alkaline concentrate is subsequently used as wash or dilution water in brownstock washing fiberline with a dilution factor of up to about 4.0. Preferably a major part of the alkaline concentrate is used as wash or dilution water in brownstock washing fiberline, suitably at least about 50%, preferably at least about 70% and most preferred at least 90%. At least a part of the brownstock washing filtrate is then further brought in one or more steps to the chemical recovery system.

The process increases recovery of dissolved organics when one or more filtrate flows from bleach plant washing equipment is run in e.g. a so called jump stage configuration. The preferred jump stage configuration implies that all or a portion of filtrate from a down stream washer is not returned in a strictly counter-current fashion to the preceding washer but is jumped around that preceding washer to one or more positions in the fiberline upstream from that washer, preferably at a washer having a similar pH. This process is particularly useful when the washer jumped around is operated in an open fashion and has its filtrate sent outside the counter-current filtrate loop, typically to either biological treatment or discharged from the mill to a receiving water.

In accordance to the present process it is desirable to discharge all or a portion of the acid filtrates (or slightly alkaline) in pulp bleaching, since it is a way of providing a purge for many inorganic cation and anions. However, it is also possible to treat such purged filtrates by evaporation and/or electrodialysis.

The process of the present invention can be used for treating alkaline filtrates received from any bleaching sequence, TCF (total chlorine free) bleaching as well as ECF (elemental chlorine free) bleaching. However, the present process can be particularly useful when handling filtrates in an ECF bleach plant. It is also preferred to treat filtrates deriving from treatments of chemical pulps. Typical bleaching sequences used may be a conventional DEDED-sequence, where D is for chlorine dioxide bleaching and E stands for an alkaline extraction stage. The D-stage may also include chlorine bleaching and the E-stage can be reinforced with oxygen and/or peroxide. The bleaching of the pulp may also be preceded by an oxygen delignifying stage. Suitably the pulp, prior to the first treatment step, has a Kappa no. in the range of from about 5 up to about 40, and a Kappa factor ($ClO_2$ as % active chlorine applied on pulp divided by the incoming Kappa number) of up to about 0.25.

When jump stage washing is applied from the bleach plant's alkaline filtrate to the last brownstock water, most of the alkaline filtrate applied in excess of the brownstock washer dilution factor (DF) will carry forward to the bleach stage that has been jumped around and exit with that stage's filtrate. In general, this hydraulic constraint will limit jump stage partial closure to 20–50% of the total alkaline filtrate flow, depending on the total volume of bleach plant alkaline filtrate flow. In full counter-current washing, the washing efficiency is limited only by the total washing efficiency of the entire wash line and the amount of wash water applied. In jump stage washing the amount of dissolved solids that can be pushed back to the recovery cycle is limited by washer efficiencies and by the hydraulic balance. The dilution factor (DF) for pulp washing equipment is defined as the amount of wash water, in $m^3$/tonne dry pulp, added over and above the amount of filtrate in the pulp mat, in $m^3$/tonne dry pulp, leaving the washer. With perfect displacement washing, one would only have to add that amount of wash water to push all dissolved solids to the recovery cycle. Most mills run their brownstock wash lines at dilution factors between 1.0–3.0 $m^3$ of wash liquor/tonne pulp and have total alkaline filtrate flows of 5–10 $m^3$/tonne pulp. For example, if the washer has a mat consistency of 12.5% there is 7 $m^3$/tonne pulp of liquid in the pulp mat. If a dilution factor of 2.0 is applied to the washer, then 9 $m^3$/tonne pulp wash water is needed. The net displacement is 2 $m^3$/tonne of pulp.

The brownstock washing dilution factor (DF) should be up to about 4.0. DF can be in the range from about 0.5 up to about 4.0, suitably in the range from about 1.0 up to about 3.5, and preferably in the range of from about 1.5 up to about 3.0.

The share of the alkaline concentrate to the total amount of the alkaline filtrate is in the range from about 13% up to about 50% on a weight-to weight basis, while the stream depleted in organic compounds contain from about 50% up to about 87% based on the total amount of the alkaline filtrate on a weight-to-weight basis. However, when discussing the alkaline filtrate concentration, in relation to of the original alkaline filtrate volume, it is convenient to use the so called volume reduction factor (VRF). VRF is defined as the volume of initial feed flow feeding a separation unit, prior to addition of any circulation flow, divided by the flow rate of the retentate (concentrated stream). Overall volume reductions of filtrate should range from about 2 up to about 7.5. Suitably the VRF is in the range from about 2.5 up to about 6, preferably from about 3.0 up to about 5, and most preferred from about 3.5 up to about 4.5.

The alkaline filtrate may have a concentration of dissolved solids in the range from about 0.1% up to about 5.0% by weight, suitably in the range from about 0.3% up to 3.0% by weight, and preferably in the range of from about 0.5% up to about 2.5% by weight. The organically depleted stream may have a concentration of dissolved solids in the range from about 0.05% up to about 2.0% by weight, suitably in the range from about 0.1% up to 1.5% by weight, and preferably in the range of from about 0.2% up to about 1.0% by weight.

The recovery of the alkaline concentrate is not limited for recycle to a specific position in the brownstock washer fiberline. The alkaline concentrate can be added at any position in the fiberline, but most preferably it is added only as replacement wash water for fresh water so that the load to the chemical recovery evaporators is not significantly impacted. Most of the fresh water added to the brownstock fiberline is on the last wash stage, therefore ideally most of the concentrated alkaline filtrate would be added there also. It is important that the concentrate be added in a way that maximizes its recovery into the brownstock liquor recovery system. Therefore, if a vacuum drum or other displacement washing equipment is used, the alkaline concentrate should be added as the first wash water followed by clean or other washing water that is less desirable to recover into the chemical recovery liquor system. If a displacement press is used for washing, it may be desirable to add the alkaline concentrate to the press feed tank as dilution water prior to feeding the press. If washing efficiencies allow, it may be desirable to add the alkaline concentrate to one or more stages ahead of the last washer as either wash water or dilution water and then to run the following washers at a lower dilution factor than the preceding washers so as to not impact the total fresh water input to the brownstock fiberline. For example, if the last two brownstock washing units were displacement presses, then they could possibly be run efficiently at a dilution factor of 0.5. The alkaline concentrate, for example 2 $m^3$/tonne, could be introduced as wash water to the wash stage preceding the second to last washing unit (first wash press). The 0.5 $m^3$/tonne of wash water coming from the last two wash presses would then combine with the alkaline concentrate to result in a total dilution factor of 2.5 from that point preceding upstream in the process, assuming no further infiltration of fresh water into the wash line.

According to one embodiment of the present invention, the depleted stream withdrawn from the alkaline concentrate (step ii)), can be used as wash water on the last brownstock washer's showers (or nozzles) following those showers which use either fresh water or the alkaline concentrate, or a combination of those, on that washer, and in an amount less than exists in the final pulp mat, thus carrying over most of the material to the open acid (or slightly alkaline) stage.

The bleach plant alkaline wash filtrate may, for instance, have the following composition: 0–35 g/l COD, 0–0.2 g/l AOX, 0–10 g/l $Na^+$, 0–3 g/l $Cl^-$, as well as other anions, such as $OH^-$, $HCO_3^{2-}$, $CO_3^{2-}$, and $SO_4^{2-}$. Both acid and alkaline bleach plant wash filtrates contain the cations Ca, Mg and Ba, but these are typically from 5 up to 20 times greater in the acid wash filtrates compared to the alkaline filtrates. In addition, there are a great number of organic anions present in both acid and alkaline filtrates. The dissolved organics in the bleach plant alkaline filtrates are of higher molecular weight on average than the bleach plant acid wash filtrates, making the organics in the acid filtrates easier to biodegrade in effluent treatment systems.

Ultra- or nanofiltration, or a combination of both, are two possible unit operations for the concentration of dissolved organics without significantly concentrating inorganics into the recycled concentrated alkaline filtrate. In these filtration processes high molecular weight organic compounds are retained with high efficiency while low molecular weight organic compounds are retained at a lower efficiency. Suitably ultrafiltration is used. Ultra- or nanofiltration process is suitably carried out at high pressure, through a filter, which is more permeable for monovalent ions such as $Cl^-$ and $K^+$, than larger ions e.g. sulphate and organic compounds. The membranes may also be negatively charged in order to repel e.g. sulphate ions. Thus, a chloride and potassium enriched concentrate is separated from e.g. a sulphate and organic concentrate, depleted of chloride, Temperature range in the chosen separation process is suitably in the range from about 5° C. up to about 120° C., preferably in the range from about 30° C. up to about 100° C., and most preferred in the range from about 50° C. up to about 90° C. Pressure range in the chosen separation process is suitably in the range from about 1 bar up to about 50 bar, preferably in the range from about 2 bar up to about 20 bar, and most preferred in the range from about 3 bar up to about 10 bar. Suitable membranes must preferably be able to withstand a pH range of from about 9.0 up to about 12.0. The material of construction for the membrane can be, for example, polymeric products such as polysulfone and its derivatives or alternatively mineral or ceramic material. The membrane unit construction may be of the plate, tubular, spiral wound, fiber or any other suitable design. It is also possible to further treat the withdrawn depleted stream by a combined treatment with ultra- and nanofiltration.

Overall recoveries which follow are on a mass basis of material removed from the total bleach plant alkaline filtrate flow and recovered into the pulping liquor cycle. The total volume of concentrate is suitably in the range from about 0.1 up to about 4 $m^3$/tonne of pulp, preferably from about 0.5 up to about 3 m3/tonne of pulp and most preferred from about 1 up to about 2 $m^3$/tonne.

Overall recovery of COD can be in the range from about 55% up to about 99%, suitably from about 60% up to about 90%, and preferably from about 70% up to about 85%.

Overall recovery of Color can be in the range from about 60% up to about 99%, suitably from about 65% up to about 95%, and preferably from about 75% up to about 90%.

Overall recovery of AOX can be in the range from about 55% up to about 99%, suitably from about 60% up to about 90%, and preferably from about 70% up to about 85%.

Overall recovery of resin acids and sterols can be in the range from about 15% up to about 99%, suitably from about 30% up to about 95%, and preferably from about 50% up to about 90%.

Overall recovery of chlorides can be in the range from about 15% up to about 60%, suitably from about 15% up to about 50%, and preferably from about 15% up to about 30%.

The acidic filtrates can be treated with standard or improved biological waste treatment systems to meet AOX, COD and color targets for the mills effluent discharges or directly discharged to the mills receiving water.

The present process is preferably carried out in combination with a whole concept for closing up the bleach plant. Hence, in the case of an ECF bleach plant, such a concept may include the control of chlorides and potassium by directly or selectively purging of recovery boiler electrostatic precipitator (ESP) dust. Chlorides can be controlled by either direct discharge of ESP dust, leaching ESP dust, or crystallization of ESP dust. The advantage of crystallization is a high recovery of sodium and sulphur with a high removal efficiency of chloride and potassium. A crystallization process for treating ESP dust, also called "PDR" (Precipitator Dust Recovery), is limited in chloride removal by its separation efficiency of approximately 85%–90% and the total mass of chloride in the ESP dust. The mass of the dust is typically between 48% of total fired solids or 70 to 140 kg/tonne pulp and the concentration of chloride depends on the concentration of chlorides in the fired liquor and on boiler specific parameters. In general, the chloride in the dust is enriched by about 2.5 times relative to sodium from its concentration in the fired liquor. Some mills have low "native" chlorides in the washing liquor at approximately 1 g/litre. This constrains partial closure of conventional ECF mills to approximately 30% of the alkaline filtrate even with PDR. This constraint can be taken care of by having the unit operation used for alkaline filtrate organic concentration which splits chloride equally with the water to achieve a net chloride input of less than 25% of the total chlorides in the alkaline filtrate.

In another embodiment, the treatment of the alkaline filtrates is combined with a separate treatment of acid filtrate. The acid stage filtrate can be submitted to an electrodialysis treatment as evident from EP-B-0653511, which is hereby included by reference, comprising an electrodialysis device with alternating anion-and cation-selective membranes, where its content of inorganic salts is reduced in the range of about 70% up to about 95%, preferably from about 80% up to about 90%. The content of organic matter is virtually unchanged. This salt-free stream can thereafter be recovered by further evaporation and combustion in a separate thermal oxidation unit.

The invention is not restricted to the embodiments described above. In the description and the appended claims, the figures in % and parts are all by weight, unless otherwise stated.

Examples

These experiments have been conducted to show the effect of separating COD, AOX and chlorides from a ECF bleach plant's alkaline filtrate streams according to the invention using ultrafiltration. The filtrate was obtained from a Swedish mill running a softwood D(EOP)DED bleach sequence. The Kappa number to the bleach plant was 13. The chemical charges were typical for ECF bleaching of softwood kraft pulp to a final brightness of 90% ISO. The Kappa factor (% active chlorine on pulp/Kappa no.) to the first D stage was 0.23. The filtrate collected was from the EOP stage which included overflow from the E stage. The content of COD, AOX and $Cl^-$ in the feed were as follows: COD in the range of from 1200 to 1500 mg/l, AOX in the range of from 10 to 13 mg/l, and $Cl^-$ in the range of from 160 to 180 mg/l. The ultrafiltration unit was operated at 7.5–8.0 bars pressure and 50° C. The laboratory membrane unit was of the tubular design and run with a constant cross flow feed of 1800 l/h. The membrane was PCI LTD's membrane ES404 which has a molecular weight cut-off of 4000 daltons and the unit was fed from a 800 litre feed tank containing the alkaline filtrate. After separation, the permeate (depleted stream) and retentate (concentrate) were returned to the feed tank to allow for continuos operation of the membrane unit. The volume reduction factor (VRF) is defined as the volume of initial feed flow prior to addition of the circulation flow divided by the flow rate of the retentate (concentrated stream). Retention is defined as the amount of a component retained in the retentate flow relative to the amount of the component in the fresh feed flow (before mixing with circulation). Analysis for AOX, COD, and Cl$^-$, were done on the feed, permeate and retentate. On basis of the measured amounts of COD, AOX and Cl$^-$ from the ultrafiltration at different VRF, corresponding dilution factors in a brownstock fiberline washing filtrate are shown. From table I (with dilution factor 1.5), table II (with dilution factor 2.5) and table III (with dilution factor 3.5) below, the results for overall recovery of COD, AOX and Cl$^-$ for corresponding brownstock dilution factors 1.5, 2.5 and 3.5 are shown. In the tables, the overall ECF bleach plant recoveries for COD, AOX and Cl$^-$ are based on laboratory data obtained by ultrafiltration. Corresponding mill brownstock washing dilution factor of 1.5, 2.5 and 3.5. Bleach plant alkaline filtrate flow corresponds to 6.0 m$^3$/tonne pulp for example (in tables: *Based on washing hydraulic constraints and efficiencies when running jump stage washing).

TABLE I

| | | Membrane Operation | | | | | Bleach Plant | | |
| | Maximum | Feed | Retentate | | | | Overall Recovery | | |
| | Recovery* | Flow | Flow | % Retention | | | % of Alkaline Filtrate | | |
| VRF | % | m3/mt | m3/mt | COD | AOX | Cl | COD | AOX | Cl |
|---|---|---|---|---|---|---|---|---|---|
| 1.2 | 28.5 | 6.0 | 5.00 | 95.8 | 96 | 78.1 | 27.3 | 27.4 | 22.3 |
| 2 | 47.5 | 6.0 | 3.00 | 87.7 | 90.1 | 46.6 | 41.7 | 42.8 | 22.1 |
| 3 | 71.3 | 6.0 | 2.00 | 81.9 | 84.2 | 33.2 | 58.4 | 60.0 | 23.7 |
| 4 | 95.0 | 6.0 | 1.50 | 76.1 | 78.3 | 25.1 | 72.3 | 74.4 | 23.8 |
| 6 | 95.0 | 6.0 | 1.00 | 68 | 70.9 | 16.7 | 64.6 | 67.4 | 15.9 |
| 10 | 95.0 | 6.0 | 0.60 | 58.9 | 59 | 10.1 | 56.0 | 56.1 | 9.6 |

TABLE II

| | | Membrane Operation | | | | | Bleach Plant | | |
| | Maximum | Feed | Retentate | | | | Overall Recovery | | |
| | Recovery* | Flow | Flow | % Retention | | | % of Alkaline Filtrate | | |
| VRF | % | m3/mt | m3/mt | COD | AOX | Cl | COD | AOX | Cl |
|---|---|---|---|---|---|---|---|---|---|
| 1.2 | 47.5 | 6.0 | 5.00 | 95.8 | 96 | 78.1 | 45.5 | 45.6 | 37.1 |
| 2 | 79.2 | 6.0 | 3.00 | 87.7 | 90.1 | 46.6 | 69.4 | 71.3 | 36.9 |
| 3 | 95.0 | 6.0 | 2.00 | 81.9 | 84.2 | 33.2 | 77.8 | 80.0 | 31.5 |
| 4 | 95.0 | 6.0 | 1.50 | 76.1 | 78.3 | 25.1 | 72.3 | 74.4 | 23.8 |
| 6 | 95.0 | 6.0 | 1.00 | 68 | 70.9 | 16.7 | 64.6 | 67.4 | 15.9 |
| 10 | 95.0 | 6.0 | 0.60 | 58.9 | 59 | 10.1 | 56.0 | 56.1 | 9.6 |

TABLE III

| | | Membrane Operation | | | | | Bleach Plant | | |
| | Maximum | Feed | Retentate | | | | Overall Recovery | | |
| | Recovery* | Flow | Flow | % Retention | | | % of Alkaline Filtrate | | |
| VRF | % | m3/mt | m3/mt | COD | AOX | Cl | COD | AOX | Cl |
|---|---|---|---|---|---|---|---|---|---|
| 1.2 | 66.5 | 6.0 | 5.00 | 95.8 | 96 | 78.1 | 63.7 | 63.8 | 51.9 |
| 2 | 95.0 | 6.0 | 3.00 | 87.7 | 90.1 | 46.6 | 83.3 | 85.6 | 44.3 |
| 3 | 95.0 | 6.0 | 2.00 | 81.9 | 84.2 | 33.2 | 77.8 | 80.0 | 31.5 |
| 4 | 95.0 | 6.0 | 1.50 | 76.1 | 78.3 | 25.1 | 72.3 | 74.4 | 23.8 |
| 6 | 95.0 | 6.0 | 1.00 | 68 | 70.9 | 16.7 | 64.6 | 67.4 | 15.9 |
| 10 | 95.0 | 6.0 | 0.60 | 58.9 | 59 | 10.1 | 56.0 | 56.1 | 9.6 |

As evident from tables I, II and III, COD- and AOX-recovery are maximized in the range 2–7. Independent of other conditions, the Tables I–Ill show that the most suitable for the VRF is 2–7, thus lower than previously recommended by known processes.

What is claimed is:

1. A process for reducing the amount of dissolved organic compounds in waste water discharged from a bleach plant, said waste water comprising alkaline wash filtrate from treatment-steps and/or delignification/bleaching-steps of pulp, said process comprising:
   i) treating at least a part of the alkaline filtrate in order to produce an alkaline concentrate enriched in high molecular weight dissolved organic compounds and a stream depleted in organic compounds, where the share of the alkaline concentrate to the total amount of the alkaline filtrate corresponds to a volume reduction factor in the range of from about 2.0 up to about 7.5,
   ii) withdrawing the depleted stream,
   iii) collecting at least a part of the alkaline concentrate from step i) and using the concentrate as wash or dilution water in brownstock washing fiberline with a dilution factor of up to about 4.0, where at least a part of said washing filtrate is brought to the chemical recovery system.

2. The process of claim 1 wherein the amount of dissolved organic compounds in the alkaline concentrate, with respect to overall COD, is at least about 55%, based on the total bleach plant alkaline filtrate flow.

3. The process of claim 1 wherein the pulp is bleached in an elemental chlorine free sequence.

4. The process of claim 1 wherein the pulp is bleached in an totally chlorine free sequence.

5. The process of claim 1 wherein the volume reduction factor is in the range from about 2.5 up to about 6.

6. The process of claim 5 wherein the volume reduction factor is in the range from about 3.0 up to about 5.0.

7. The process of claim 1 wherein the brownstock fiberline dilution factor (DF) is in the range of from about 1.0 up to about 3.5.

8. The process of claim 1 wherein the treatment in step i) is carried out by ultrafiltration.

9. The process of claim 1 wherein said depleted stream withdrawn in step ii) is used as wash water on the last brownstock washers showers following showers using either fresh water or the alkaline concentrate, or a combination of those, on that washer, and in an amount less than exists in the final pulp mat, thus carrying over most of the material to the open acid or slightly alkaline stage.

10. The process of claim 1 wherein the withdrawn depleted stream in step ii) can be further treated by a combination of nanofiltration and ultrafiltration.

11. The process of claim 1 the withdrawn depleted stream in step ii) can be further treated by a combination of nanofiltration and ultrafiltration.

* * * * *